US012766998B2

(12) United States Patent
Miao et al.

(10) Patent No.: US 12,766,998 B2
(45) Date of Patent: Oct. 20, 2026

(54) BATTERY BOX TRANSFERRING DEVICE

(71) Applicant: CONTEMPORARY AMPEREX TECHNOLOGY (HONG KONG) LIMITED, Hong Kong (CN)

(72) Inventors: Huahui Miao, Ningde (CN); Ying Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 309 days.

(21) Appl. No.: 18/624,153

(22) Filed: Apr. 2, 2024

(65) Prior Publication Data

US 2024/0239234 A1 Jul. 18, 2024

Related U.S. Application Data

(63) Continuation of application No. PCT/CN2022/080174, filed on Mar. 10, 2022.

(51) Int. Cl.
*B60L 53/80* (2019.01)
*F16H 19/02* (2006.01)

(52) U.S. Cl.
CPC .............. *B60L 53/80* (2019.02); *F16H 19/02* (2013.01)

(58) Field of Classification Search
CPC .......... B60L 53/80; B60L 50/64; F16H 19/02; B60K 1/04; B60K 2001/0461;
(Continued)

(56) References Cited

U.S. PATENT DOCUMENTS

2019/0164928 A1* 5/2019 Yoshino .................. H10P 72/50
2021/0060763 A1* 3/2021 Xu ......................... B25J 9/0072
2021/0384580 A1* 12/2021 Powell ................... G07C 5/085

FOREIGN PATENT DOCUMENTS

CN 101837768 A 9/2010
CN 102152133 A 8/2011
(Continued)

OTHER PUBLICATIONS

The extended European search report received in the counterpart European Application 22930297.1, mailed on Sep. 11, 2024.
(Continued)

*Primary Examiner* — Glenn F Myers
(74) *Attorney, Agent, or Firm* — K&L Gates LLP

(57) ABSTRACT

The present application disclose a battery box transferring device, including: a translation mechanism configured to move a battery box in a first direction and/or a second direction, the first direction being perpendicular to the second direction; a rotating mechanism arranged on the translation mechanism, the rotating mechanism comprising: a first rotating assembly and a second rotating assembly, wherein the first rotating assembly is configured to rotate the battery box about the first direction as an axis, and the second rotating assembly is configured to rotate the battery box about the second direction as an axis; and a battery box moving mechanism arranged on the rotating mechanism, the battery box moving mechanism being configured to pull the battery box into or push the battery box out of the battery box transferring device. The battery box transferring device can effectively move the battery box on various site conditions while effectively saving manpower.

13 Claims, 5 Drawing Sheets

(58) Field of Classification Search
CPC .... B60K 2001/0455; B60K 2001/0477; B60K 2001/0483; B60K 2001/0488; B60K 2001/0494; B66F 9/18; B66F 9/061; B66F 9/122; B66F 9/14; B66F 9/12; B66F 9/125; B66F 9/127; B66F 9/149; B60P 1/32; B60P 1/6418; B60P 1/6427; B60P 1/6436; B60P 1/649; B60P 1/006; B60S 13/00; B60S 13/02; B60S 5/06; B23Q 1/44
USPC .................................. 414/625, 662, 663, 671
See application file for complete search history.

(56) References Cited

FOREIGN PATENT DOCUMENTS

| | | | |
|---|---|---|---|
| CN | 202368546 | U | 8/2012 |
| CN | 203172601 | U | 9/2013 |
| CN | 106515681 | A | 3/2017 |
| CN | 108640018 | A | 10/2018 |
| CN | 109502475 | A | 3/2019 |
| CN | 209159662 | U | 7/2019 |
| EP | 2623379 | A1 | 8/2013 |
| WO | 2012105529 | A1 | 8/2012 |
| WO | 2012167688 | A1 | 12/2012 |

OTHER PUBLICATIONS

International Search Report received in the corresponding international application PCT/CN2022/080174, mailed on Nov. 29, 2022.

* cited by examiner

BATTERY BOX TRANSFERRING DEVICE

CROSS-REFERENCE TO RELATED APPLICATIONS

This application is a continuation of international application PCT/CN2022/080174, filed on Mar. 10, 2022 and entitled "BATTERY BOX TRANSFERRING DEVICE", the content of which is incorporated herein by reference in its entirety.

TECHNICAL FIELD

The present application relates to the field of batteries, and more particularly to a device for transferring a battery box.

BACKGROUND

Batteries have been widely developed and used as an important power device in the fields such as electronic devices and transportation means. With the increasing energy demand, the applications of batteries are expanding, where the installation and transportation technologies of batteries are particularly important.

In fact, the energy storage capacity of a battery cell is very limited and cannot support the continuous energy supply in daily production and life. Therefore, a plurality of battery cells, a case, a battery management system and associated mounting structural members are usually assembled into a battery box, and a plurality of battery boxes are placed in a battery cabinet for use as an energy supply system. Due to the large size and heavy weight of the battery box, it is impossible to move the battery box by manpower alone, so how to move the battery box in an efficient and labor-saving manner is a problem to be solved.

SUMMARY

Embodiments of the present application provide a battery box transferring device, which can efficiently move a battery box on various site conditions while effectively saving manpower.

In a first aspect, a battery box transferring device is provided, including: a translation mechanism configured to move a battery box in a first direction and/or a second direction, the first direction being perpendicular to the second direction; a rotating mechanism arranged on the translation mechanism, the rotating mechanism comprising: a first rotating assembly and a second rotating assembly, wherein the first rotating assembly is configured to rotate the battery box about the first direction as an axis, and the second rotating assembly is configured to rotate the battery box about the second direction as an axis; and a battery box moving mechanism arranged on the rotating mechanism, the battery box moving mechanism being configured to pull the battery box into or push the battery box out of the battery box transferring device.

In this embodiment of the present application, the battery box transferring device has the translation mechanism and the rotating mechanism, and the translation mechanism can move the battery box on a plane defined by the first direction and the second direction to control the position of the battery box on the plane. The rotating mechanism can adjust the angle of the plane in the first direction and the second direction to control the angle of the battery box. The battery box moving mechanism can pull the battery box into or push the battery box out of the battery box transferring device, without manually pushing or pulling the battery box. The translation mechanism and the rotating mechanism of the battery box transferring device can adjust the position and angle of the battery box quickly and flexibly, such that the battery box can be accurately moved to a desired position whether on a flat indoor ground or on an uneven outdoor site, thereby improving the efficiency of transferring the battery box, expanding the applications of the battery box and saving manpower.

In some embodiments, the battery box moving mechanism includes: a battery box compartment, a pushing assembly, and a roller assembly, wherein the pushing assembly and the roller assembly are arranged inside the battery box compartment; and the battery box compartment is configured to accommodate the battery box, and the pushing assembly is configured to move the battery box in the first direction, allowing the battery box to move on the roller assembly.

In this embodiment of the present application, the battery box compartment of the battery box moving mechanism can accommodate the battery box and prevent the battery box from accidentally falling during the movement; the pushing assembly enables the battery box to be pushed out or pulled into the battery box transferring device, without manual pushing and pulling; the roller assembly and the pushing assembly cooperate to reduce a friction force between the battery box and the battery box compartment during the movement of the battery box, thereby reducing the power consumption required for moving the battery box, saving manpower and reducing the power consumption of the battery box transferring device.

In some embodiments, the pushing assembly includes: a guide rail arranged inside the battery box compartment in the first direction; and a push-pull portion arranged on the guide rail, the push-pull portion sliding along the guide rail to move the battery box.

In this embodiment of the present application, the guide rail and the push-pull portion cooperate to achieve functions of the pushing assembly. The arrangement of the guide rail and the push-pull portion allows to save the space occupied by the pushing assembly, making an internal structure of the battery box transferring device more compact and improving the space utilization of the battery box transferring device.

In some embodiments, the push-pull portion has a connector configured for connection to the battery box when the battery box is moved by the push-pull portion.

In this embodiment of the present application, since the push-pull portion is provided with the connector capable of connecting the battery box to the battery box compartment, the battery box can be pulled into the battery box compartment by means of the connector without manpower, thereby facilitating saving on the manpower.

In some embodiments, the translation mechanism includes: a first translation assembly configured to move the battery box in the first direction.

In some embodiments, the first translation assembly includes: a base plate; a first sliding rail arranged on the base plate in the first direction; a first slider arranged on the first sliding rail; a first moving plate arranged on the first slider, the first slider moving along the first sliding rail to drive the first moving plate to move in the first direction so as to move the battery box in the first direction.

In this embodiment of the present application, the sliding rail and the slider cooperate to achieve functions of the first translation assembly, such that the first translation assembly can move the battery box in the first direction quickly and flexibly; and the form of the sliding rail and the slider can also reduce a friction force between components, facilitating reduction of the power consumption required for moving the battery box.

In some embodiments, the translation mechanism includes: a second translation assembly configured to move the battery box in the second direction.

In some embodiments, the second translation assembly includes: a second sliding rail arranged on the first moving plate in the second direction; a second slider arranged on the second sliding rail; and a second moving plate arranged on the second slider, the second slider moving along the second sliding rail to move the second moving plate in the second direction.

In this embodiment of the present application, the sliding rail and the slider cooperate to achieve functions of the second translation assembly, such that the second translation assembly can move the battery box in the second direction quickly and flexibly; and the small friction force between the components facilitates reduction of the power consumption required for moving the battery box.

In some embodiments, the rotating mechanism includes a cross shaft, the first rotating assembly being connected to the second rotating assembly by means of the cross shaft.

In this embodiment of the present application, the rotations of the rotating assembly in two different directions can be realized by one component, i.e., the cross shaft, which helps to achieve the rotation function of the rotating mechanism and also facilitates saving on the space occupied by the rotating mechanism and reducing the overall height of the battery box transferring device, such that the battery box transferring device can meet requirements for the operation of transferring a battery box at a low position, further expanding the applications of the battery box transferring device.

In some embodiments, the first rotating assembly includes: a first driving mechanism connected to the cross shaft in the first direction, the first driving mechanism driving the cross shaft to rotate about the first direction as an axis, such that the battery box is rotated about the first direction as an axis.

In some embodiments, the first rotating assembly further includes: a first torque limiter arranged on the first driving mechanism and configured to control torque of the first driving mechanism.

In this embodiment of the present application, the torque limiter is provided to protect the first driving mechanism from mechanical damages to the driving mechanism due to overloading of a rotating rod.

In some embodiments, the second rotating assembly includes: a second driving mechanism connected to the cross shaft in the second direction, the second driving mechanism driving the cross shaft to rotate about the second direction as an axis, such that the battery box is rotated about the second direction as an axis.

In some embodiments, the second rotating assembly further includes: a second torque limiter arranged on the second driving mechanism and configured to control torque of the second driving mechanism.

In this embodiment of the present application, the driving mechanism drives each functional component to operate to realize the automatic transfer of the battery box. Each of the first driving mechanism and the second driving mechanism can drive the battery box to realize rotations in different directions without affecting each other, thereby flexibly adjusting the angle of the battery box while reducing manual involvements, and effectively saving manpower.

In some embodiments, the device is arranged on a forklift, and the battery box is placed into a battery cabinet by means of the device and the forklift.

In this embodiment of the present application, the battery box transferring device can be used with the forklift to carry out the operation of battery box stacking in an efficient and labor-saving manner, further enriching the applications of the battery box transferring device.

BRIEF DESCRIPTION OF THE DRAWINGS

In order to illustrate the technical solutions of the embodiments of the present application more clearly, the drawings required in the description of the embodiments of the present application will be described briefly below. Obviously, the drawings described below are merely some embodiments of the present application, and for those of ordinary skill in the art, other drawings can also be obtained from these drawings without any creative efforts.

DETAILED DESCRIPTION OF EMBODIMENTS

Figure 1:
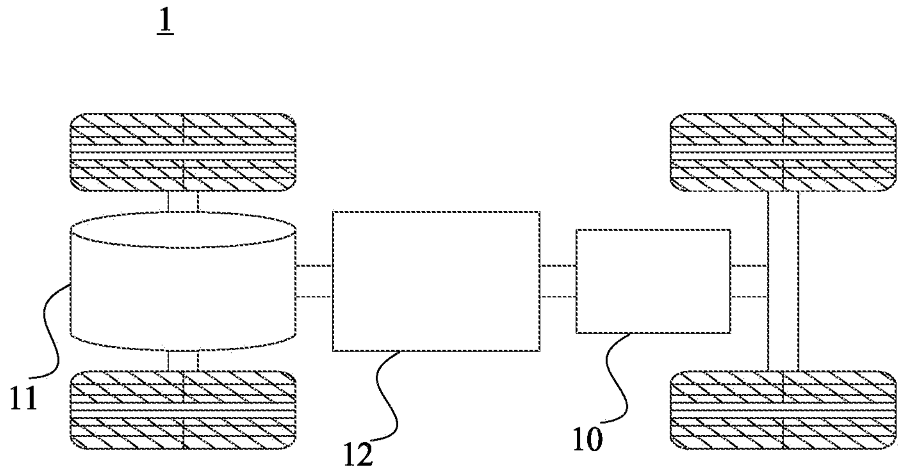
FIG. 1 is a schematic structural diagram of a vehicle according to the present application.

The implementations of the present application will be further described in detail below in conjunction with the accompanying drawings and embodiments. The following detailed description of the embodiments and the accompanying drawings are used to illustrate the principle of the present application by way of example but should not be used to limit the scope of the present application. That is, the present application is not limited to the described embodiments.

In the description of the present application, it should be noted that "a plurality of" means two or more, unless otherwise specified. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and should not be construed as indicating or implying the relative importance. The term "perpendicular" does not mean being perpendicular in the strict sense, but within an allowable range of errors. The term "parallel" does not mean being parallel in the strict sense, but within an allowable range of errors.

The orientation terms in the following description all indicate directions shown in the drawings, but do not limit the specific structure in the present application. In the description of the present application, it should also be noted that the terms "disposing", "connecting", and "connection" should be interpreted in the broad sense unless explicitly defined and limited otherwise. For example, the terms may mean a fixed connection, a detachable connection, or an integral connection, or may mean a direct connection, or an indirect connection by means of an intermediate medium. For those of ordinary skill in the art, the specific meanings of the terms mentioned above in the present application can be construed according to specific circumstances.

The term "and/or" in the present application is merely a description of the associated relationship of associated objects, representing that three relationships may exist, for example, A and/or B, may be expressed as: presence of A, both A and B, or B. In addition, the character "/" in the present application generally indicates that the associated objects before and after the character are in a relationship of "or".

Unless otherwise defined, all technical and scientific terms used in the present application have the same meanings as those commonly understood by those skilled in the art to which the present application belongs; The terms used in the description of the present application are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion. The terms "first", "second", etc. in the description and the claims of the present application as well as the foregoing accompanying drawings are used to distinguish between different objects, rather than describing a specific order or a primary-secondary relationship.

In the present application, "embodiment" mentioned means that the specific features, structures and characteristics described in conjunction with the embodiments may be included in at least one embodiment of the present application. The phrase at various locations in the description does not necessarily refer to the same embodiment, or an independent or alternative embodiment exclusive of another embodiment. Those skilled in the art should understand, in explicit and implicit manners, that an embodiment described in the present application may be combined with another embodiment.

In actual production and life, a battery cabinet is used for the regulation and distribution of electricity to ensure the continuous supply of electricity, and battery boxes are arranged inside the battery cabinet for the battery cabinet to distribute electric energy. Due to the large size and heavy weight, the battery boxes usually need to be placed into or removed from the battery cabinet by means of the cooperation of mechanical apparatuses and manpower. A current common practice is to carry the battery boxes by a lifting mechanism and push the battery boxes into or out of the battery cabinet by manpower. This method is limited by the manpower and is inefficient, and cannot be adapted to uneven outdoor sites (e.g. sands and dirt roads).

In view of this, the present application provides a battery box transferring device, which can move a battery box efficiently without manual pushing or pulling and is adapted to a variety of applications.

In recent years, batteries as a major power device have been widely used in many fields such as electronic devices, electric bicycles, electric motorcycles, electric vehicles, military equipment, and aerospace.

For example, FIG. 1 shows a schematic structural diagram of a vehicle 1 of the present application. The vehicle 1 may be a fuel vehicle, a gas vehicle, or a new-energy vehicle. The new-energy vehicle may be a battery electric vehicle, a hybrid vehicle, an extended-range vehicle, etc. The vehicle 1 may be internally provided with a motor 11, a controller 12 and a battery 10. The controller 12 is used to control the battery 10 to supply power to the motor 11. For example, the battery 10 may be provided at the bottom or the head or the tail of the vehicle 1. The battery 10 may be used to supply power to the vehicle 1. For example, the battery 10 can serve as a power source for operating the vehicle 1 for use in a circuit system of the vehicle 1, for example, to meet the working power demand of the vehicle 1 during startup, navigation and running. In another embodiment of the present application, the battery 10 can not only serve as a power source for operating the vehicle 1, but also serve as a power source for driving the vehicle 1, instead of or partially instead of fuel or natural air, to provide driving power for the vehicle 1.

In the present application, a battery refers to a single physical module including one or more battery cells to provide electric energy. For example, the battery mentioned in the present application may include a battery module, or a battery pack, etc. The battery generally includes a case for packaging one or more battery cells. The case may prevent liquid or other foreign matters from affecting charging or discharging of a battery cell.

The battery may comprise a plurality of battery cells in order to meet different power demands, with the plurality of battery cells being in series connection, in parallel connection, or in series-parallel connection. The series-parallel connection refers to a combination of series connection and parallel connection. The battery may also be referred to as a battery pack. Optionally, the plurality of battery cells may be in series connection or in parallel connection or in series-parallel connection to constitute a battery module, and then a plurality of battery modules may in series connection or in parallel connection or in series-parallel connection to constitute the battery. That is to say, the plurality of battery cells may directly form a battery, or may form battery modules that may then form a battery.

Figure 2:
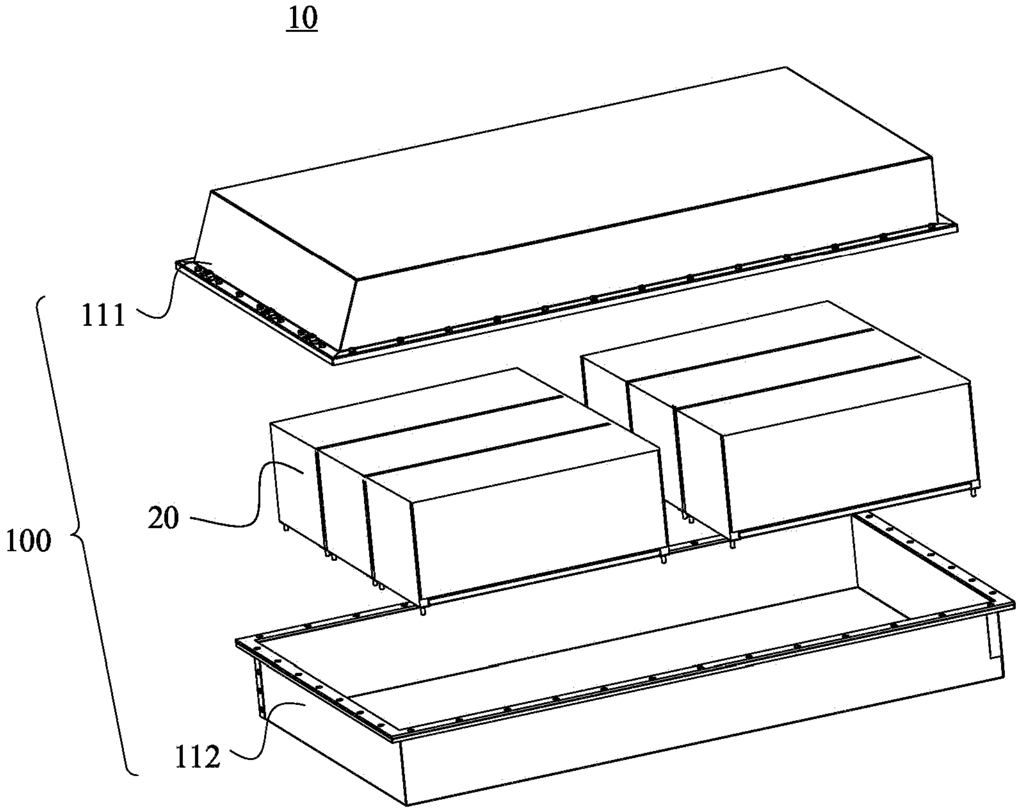
FIG. 2 is a schematic structural diagram of a battery box according to the present application.

For example, FIG. 2 shows a schematic structural diagram of a battery 10 of the present application. The battery 10 may comprise a battery box 100 and a plurality of battery cells 20 arranged in the battery box 100. The battery box 100 includes an upper box body 111 and a lower box body 112. The upper box body 111 can cover the lower box body 112 to form an enclosed space for accommodating the plurality of battery cells 20. The number of the battery cells 20 may be set as any value. The plurality of battery cells 20 may be in series connection, in parallel connection or in series-parallel connection to achieve higher capacity or power.

Optionally, the battery cell 20 may include a lithium ion secondary battery, a lithium ion primary battery, a lithium-sulfur battery, a sodium/lithium ion battery, a sodium ion battery or a magnesium ion battery, etc., which is not limited in the embodiments of the present application. In some embodiments, the battery cell 20 may also be referred to as a cell.

The battery cell 20 comprises an electrode assembly and an electrolyte. The electrode assembly is composed of a positive electrode plate, a negative electrode plate and a separator. The operation of the battery cell mainly relies on the movement of metal ions between the positive electrode plate and the negative electrode plate. The positive electrode plate includes a positive electrode current collector and a positive electrode active material layer. The positive electrode active material layer is coated on a surface of the positive electrode current collector, and the current collector not coated with the positive electrode active material layer protrudes from the current collector coated with the positive electrode active material layer and is used as a positive electrode tab. Taking a lithium-ion battery as an example, the material of the positive electrode current collector may be aluminum, and the positive electrode active material may be lithium cobalt oxides, lithium iron phosphate, ternary lithium or lithium manganate, etc. The negative electrode plate includes a negative electrode current collector and a negative electrode active material layer. The negative electrode active material layer is coated on a surface of the negative electrode current collector, and the current collector not coated with the negative electrode active material layer protrudes from the current collector coated with the negative electrode active material layer and is used as a negative tab. The negative current collector may be made of copper, and the negative electrode active material may be carbon, silicon, etc. In order to ensure that no fusing occurs when a large current passes, there are multiple positive tabs stacked together, and there are multiple negative tabs stacked together. The separator may be made from polypropylene (PP), Polyethylene (PE), or the like. In addition, the electrode assembly may be of a wound structure or a laminated structure, which will not be limited in the embodiments of the present application.

A battery box mentioned in the embodiments of the present application comprises a case, a battery management system, and related mounting structural members in addition to the battery 10.

Figure 3:
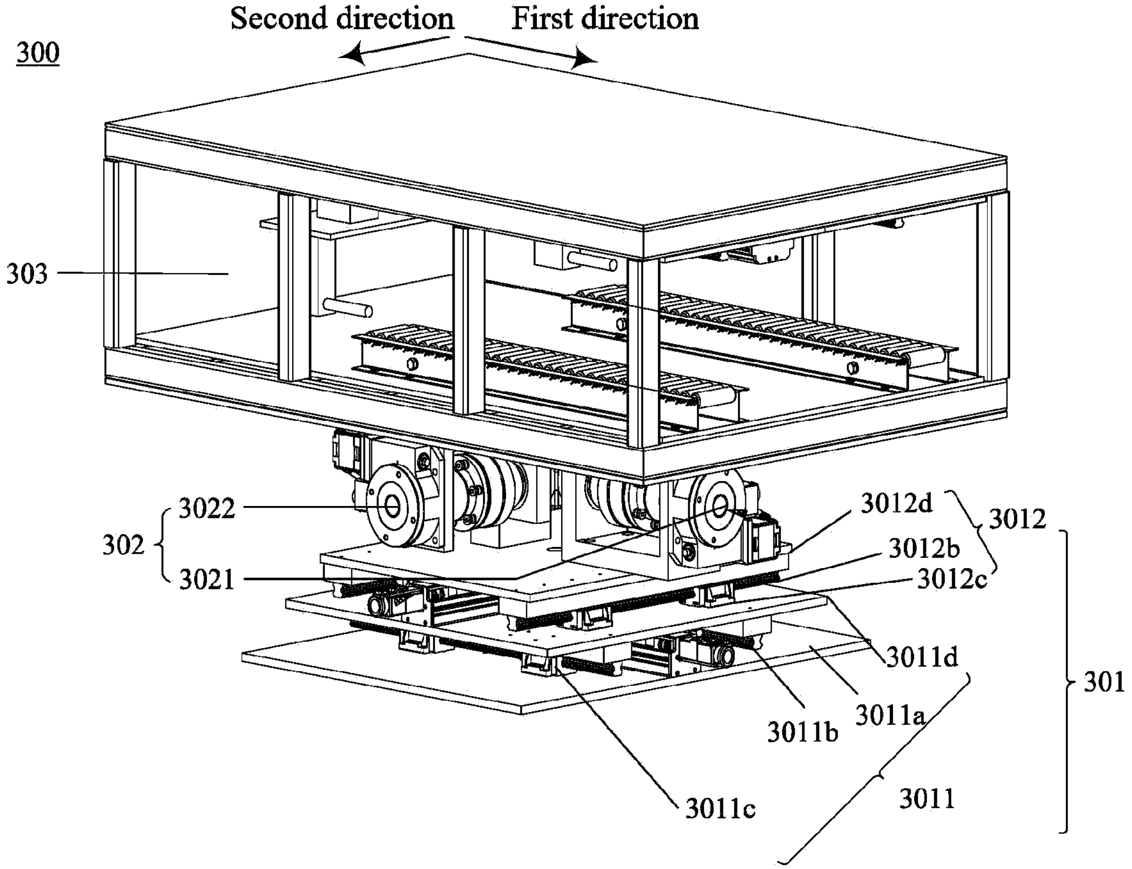
FIG. 3 is a schematic structural diagram of a battery box transferring device according to the present application.

A battery box transferring device will be described below. FIG. 3 is a schematic structural diagram of a battery box transferring device 300 of the present application.

As shown in FIG. 3, the battery box transferring device 300 includes a translation mechanism 301, a rotating mechanism 302, and a battery box moving mechanism 303.

The translation mechanism 301 is configured to move a battery box in a first direction and/or a second direction, the first direction being perpendicular to the second direction. The rotating mechanism 302 is arranged on the translation mechanism 301. The rotating mechanism 302 includes a first rotating assembly 3021 and a second rotating assembly 3022. The first rotating assembly 3021 is configured to rotate the battery box about the first direction as an axis, and the second rotating assembly 3022 is configured to rotate the battery box about the second direction as an axis. The battery box moving mechanism 303 is arranged on the rotating mechanism 302. The battery box moving mechanism 303 is configured to pull the battery box into or push the battery box out of the battery box transferring device 300.

Specifically, the translation mechanism 301 can move the battery box in at least one direction. The translation mechanism 301 may be in the form of a screw rod and a lead screw, or in the form of a pulley and a track, or the like. The rotation mechanism 302 can rotate the battery box about the first direction and the second direction respectively, and adjust the angle of the battery box in the first direction and the second direction. In this way, even on an uneven site such as the outdoors, the battery box moving mechanism can flexibly adjust the position and angle of the battery box according to the actual situations in the installation site. For example, by aligning to a battery cabinet on the uneven site, the battery box is moved more quickly to a desired position.

It should be understood that moving in a certain direction as described in the present application means moving back and forth in a certain direction, that is, either in that direction or in the opposite direction at an angle of 180 degrees from that direction.

In this embodiment, the battery box transferring device 300 can flexibly control the position of the battery box on a plane and control the angle of the battery box in at least one direction, such that the battery box can be aligned to the position to which the battery box needs to be moved and is then moved to that position by the battery box moving mechanism. The battery box transferring device 300 enables the battery box to move in a more accurate, efficient and labor-saving manner, and can be adapted to the transfer requirements of uneven outdoor sites, facilitating expanding the applications of the battery box.

Figure 4:
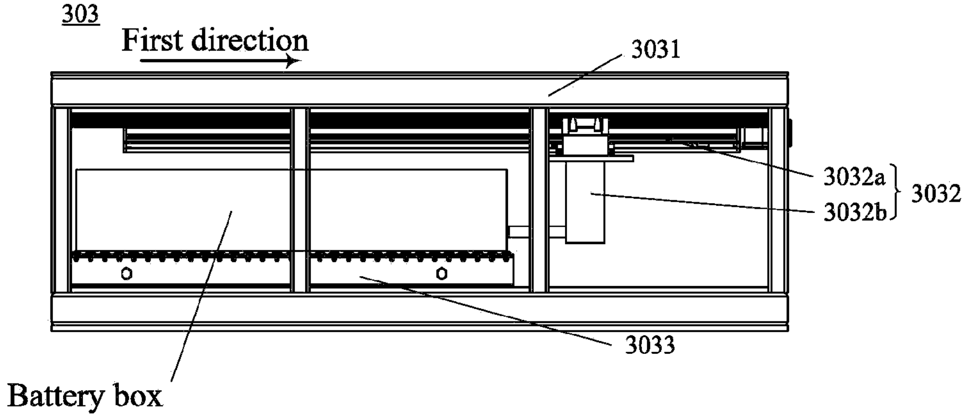
FIG. 4 is a schematic structural diagram of a battery box moving mechanism according to the present application.
Figure 5:
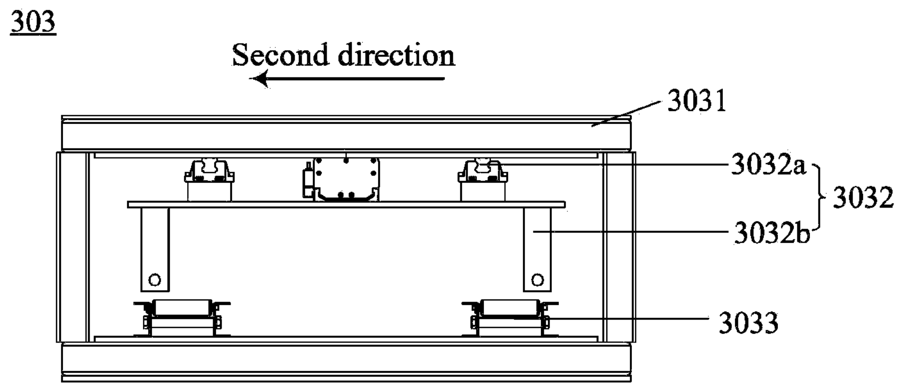
FIG. 5 is another schematic structural diagram of the battery box moving mechanism according to the present application.
Figure 6:
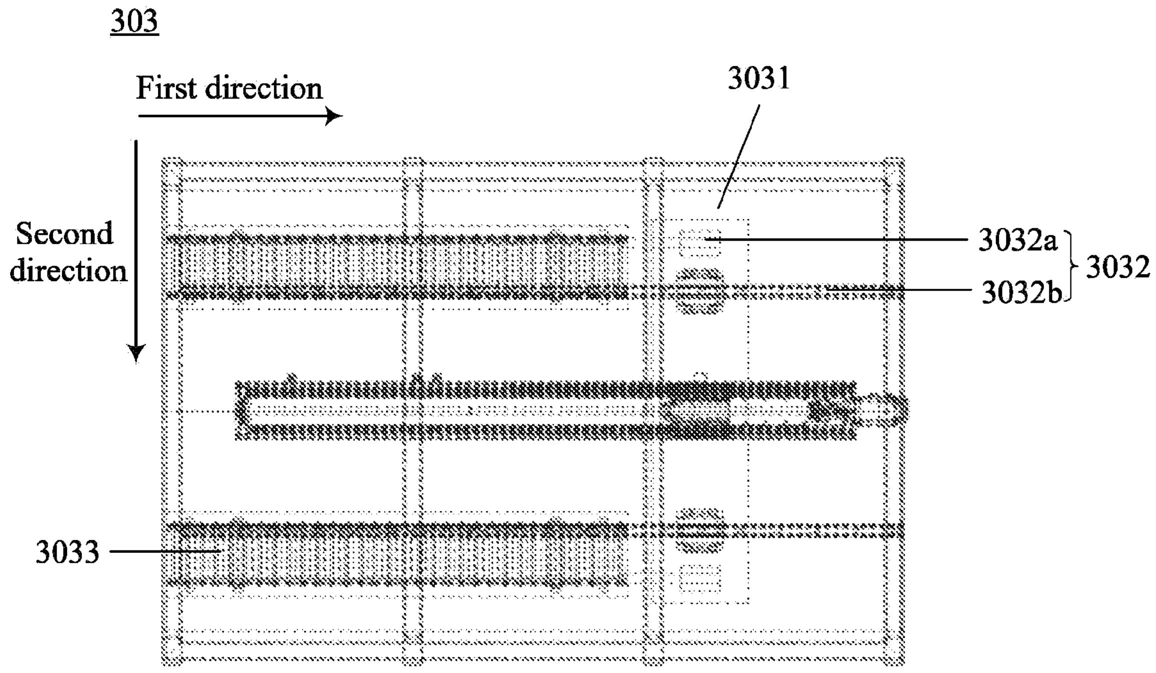
FIG. 6 is still another schematic structural diagram of the battery box moving mechanism according to the present application.

FIG. 4 illustrates a schematic left view of a battery box moving mechanism 303 according to an embodiment of the present application. FIG. 5 is a schematic front view of the battery box moving mechanism 303. FIG. 6 is a schematic bottom view of the battery box moving mechanism 303.

With reference to FIGS. 4 to 6, optionally, the battery box moving mechanism 303 includes a battery box compartment 3031, a pushing assembly 3032, and a roller assembly 3033. The pushing assembly 3032 and the roller assembly 3033 are arranged inside the battery box compartment 3031. The battery box compartment 3031 is configured to accommodate a battery box. The pushing assembly 3032 is configured to move the battery box in the first direction, allowing the battery box to move on the roller assembly 3033.

Specifically, the battery box compartment 3031 may be of a regular hexahedron structure with an opening surrounded by five sides, or may be of a frame structure consisting of a top wall, a bottom wall and a support connecting the top wall and the bottom wall as shown in FIG. 4, or may be of other spatial structure capable of accommodating a battery box. The pushing assembly 3032 and the roller assembly 3033 are both arranged inside the battery box compartment 3031. Taking the battery box compartment shown in FIG. 4 as an example, the pushing assembly 3032 may be arranged on the top wall, the roller assembly 3033 may be arranged on the bottom wall, and the battery box may be placed on the roller assembly 3033. For another example, the pushing assembly 3032 may also be arranged on the bottom wall, and the battery box is still placed on the roller assembly 3033. The pushing assembly 3032 can move in the first direction to move the battery box in the first direction.

In some other embodiments, the battery box moving structure 303 may also be provided with no roller assembly 3033, and the battery box is placed directly inside the battery box compartment 3031. Preferably, the battery box moving mechanism 303 has the roller assembly 3033. After the battery box is pushed by the pushing assembly 3032, the battery box moves to drive the roller assembly 3033 to roll, thereby reducing a friction force during the movement of the battery box.

In this embodiment, the battery box compartment 3031 of the battery box moving mechanism 303 can accommodate the battery box and prevent the battery box from accidentally falling during the movement; the pushing assembly 3032 enables the battery box to be pushed out or pulled into the battery box transferring device 300, without manual pushing and pulling; the roller assembly 3033 and the pushing assembly 3032 cooperate to reduce a friction force between the battery box and the battery box compartment 3031 during the movement of the battery box, thereby reducing the power consumption required for moving the battery box, saving manpower and reducing the power consumption of the battery box transferring device 300.

Optionally, in a possible implementation, the pushing assembly 3032 includes a telescopic rod and gripping jaws. The telescopic rod is used for extending and retracting in the first direction to move the gripping jaws. The gripping jaws are used for connecting the telescopic rod and the battery box, allowing the battery box to move in the first direction with the extending and retracting of the telescopic rod.

Optionally, with continued reference to FIG. 4, the pushing assembly 3032 includes a guide rail 3032*a* and a push-pull portion 3032*b*. The guide rail 3032*a* is arranged inside the battery box compartment 3031 in the first direction. The push-pull portion 3032*b* is arranged on the guide rail 3032*a*. The push-pull portion 3032*b* slides along the guide rail 3032*a* to move the battery box.

Specifically, the push-pull portion 3032*b* is arranged on the guide rail 3032*a* by means of a slider connected to the guide rail 3032*a*, such that the push-pull portion 3032*b* can slide along the guide rail 3032*a*. The push-pull portion 3032*b* is connected to the battery box to drive the battery box to move in the first direction along an extending path of the guide rail 3032*a*, so as to move the battery box into or out of the battery box compartment 3031. The pushing assembly 3032 may be connected to a driving mechanism. The driving mechanism is configured to drive the push-pull portion 3032*b* along the guide rail 3032*a*.

In this embodiment, the guide rail and the push-pull portion cooperate to push the battery box, which can save the space occupied by the pushing assembly, save the space for the battery box, make the structure of the whole battery box transferring device 300 more compact, and improve the space utilization of the battery box transferring device 300.

Optionally, the push-pull portion 3032*b* has a connector configured for connection to the battery box when the battery box is moved by the push-pull portion 3032*b*.

Specifically, the connector may be of a connecting rod structure as shown in FIG. 4, or may be of a structure such as a fastener, an engaging groove, and a screw. The battery box may also have a structure fitted with the connector. When the battery box needs to be pushed out of the battery box compartment 3031, the connector is connected to the battery box such that the battery box can be pushed out of the battery box compartment along with the pushing of the push-pull portion 3032*b*. When the battery box needs to be pulled into the battery box compartment 3031, the connector is connected to the battery box such that the battery box can be pulled into the battery box compartment 3031 along with an inward movement of the push-pull portion 3032*b*.

In this embodiment, the connecting function of the connector enables the battery box to be moved with the movement of the push-pull portion 3032*b*, such that the battery box is pushed out of or pulled into the battery box compartment 3031 without manpower, facilitating saving on manpower.

The translation mechanism 301 will be described below.

With reference to FIG. 3, optionally, the translation mechanism 301 includes a first translation assembly 3011, the first translation assembly 3011 being configured to move the battery box in the first direction.

Optionally, the first translation assembly 3011 includes a base plate 3011*a*, a first sliding rail 3011*b*, a first slider 3011*c*, and a first moving plate 3011*d*. The first sliding rail 3011*b* is arranged on the base plate 3011*a* in the first direction. The first slider 3011*c* is arranged on the first sliding rail 3011*b*. The first moving plate 3011*d* is arranged on the first slider 3011*c*. The first slider 3011*c* moves along the first sliding rail 3011*b* to drive the first moving plate 3011*d* to move in the first direction, so as to move the battery box in the first direction.

Specifically, the base plate 3011*a* is a base plate of the first translation assembly 3011 and also a base plate of the whole battery box transferring device 300. The first moving plate 3011*d* can move relative to the base plate 3011*a* in the first direction by means of the first sliding rail 3011*b* and the first slider 3011*c*, thereby driving the components arranged on the first moving plate 3011*d* to move in order to finally drive the battery box to move in the first direction.

In this embodiment of the present application, the first slider 3011*c* slides on the first sliding rail 3011*b* to enable the first moving plate 3011*d* to move in the first direction relative to the base plate 3011*a*, such that the battery box can be moved quickly and flexibly in the first direction. Further, the slider moving on the sliding rail can also reduce a friction force between the components during the movement, facilitating reduction of the energy consumption required for moving the battery box.

Optionally, in some other embodiments, the first translational assembly 3011 includes: a base plate 3011*a*, a track assembly, and a first moving plate 3011*d*. The track assembly is arranged on the base plate 3011*a* by means of a support structure in the first direction, and the first moving plate 3011*d* is arranged on the track assembly. The first moving plate 3011*d* can move in the first direction with the track assembly.

Optionally, the translation mechanism 301 includes a second translation assembly 3012, the second translation assembly 3012 being configured to move the battery box in the second direction.

Optionally, the second translation assembly 3012 includes a second sliding rail 3012*b*, a second slider 3012*c* and a second moving plate 3012*d*. The second sliding rail 3012*b* is arranged on the first moving plate 3011*d* in the second direction. The second slider 3012*c* is arranged on the second sliding rail 3012*b*. The second moving plate 3012*d* is arranged on the second slider 3012*c*. The second slider 3012*c* moves along the second sliding rail 3012*b* to move the battery box in the second direction.

Specifically, the first moving plate 3011*d* is a moving plate of the first translation assembly 3011 and also a base plate of the second translation assembly 3012. The second moving plate 3012*d* can move relative to the first moving plate 3011*d* in the second direction by means of the second sliding rail 3012*b* and the second slider 3012*c*, thereby driving the components arranged on the second moving plate 3012*d* to move in order to finally drive the battery box to move in the second direction.

In this embodiment, the second moving assembly 3012 may be of a similar structure to the first moving assembly 3012, enabling the battery box transferring device 300 to move the battery box in the second direction quickly and flexibly with saved power consumption. It should be understood that, similar to the first moving assembly 3011, the second moving assembly 3012 may also be of another structure such as the track assembly, which will not be repeated here.

Figure 7:
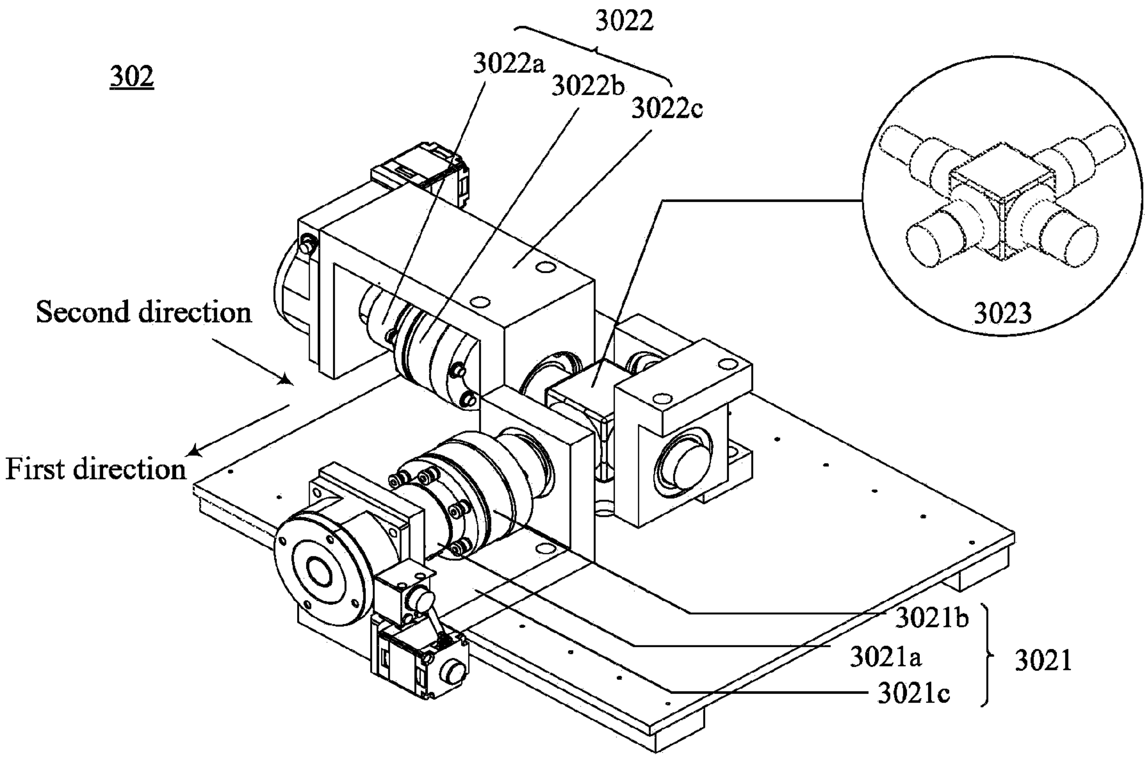
FIG. 7 is a schematic structural diagram of a rotating mechanism according to the present application.
Figure 8:
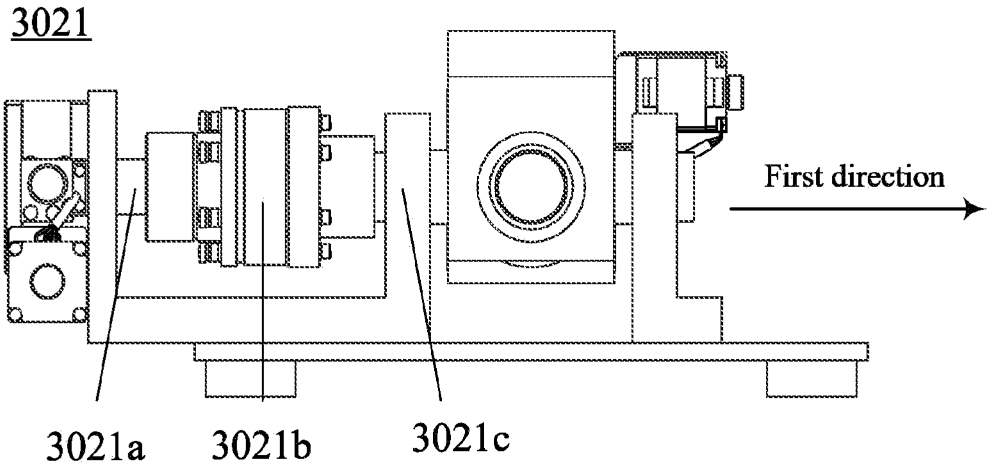
FIG. 8 is another schematic structural diagram of the rotating mechanism according to the present application.
Figure 9:
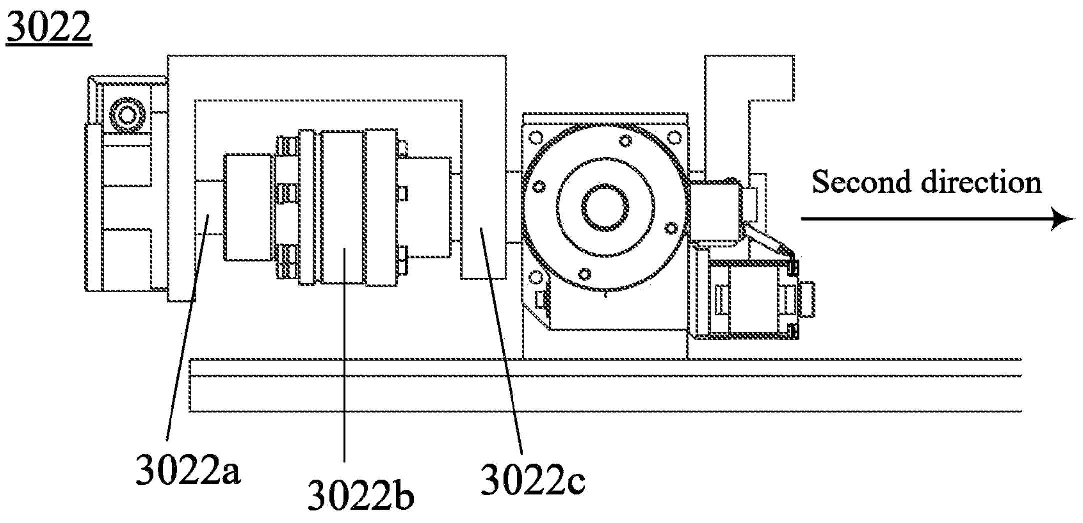
FIG. 9 is still another schematic structural diagram of the rotating mechanism according to the present application.

FIG. 7 is a schematic structural diagram of a rotating mechanism 302 according to an embodiment of the present application. FIG. 8 is a schematic structural diagram of the rotating mechanism 302 in the first direction. FIG. 9 is a schematic structural diagram of the rotating mechanism 302 in the second direction.

With reference to FIGS. 7 to 9, optionally, the rotating mechanism 302 includes a cross shaft 3023. The first rotating assembly 3021 is connected to the second rotating assembly 3022 by the cross shaft 3023.

Specifically, the cross shaft 3023 may be directly connected to the first rotating assembly 3021 and the second rotating assembly 3022. The first rotating assembly 3021 is directly driven by the driving mechanism to rotate about the first direction as an axis, so as to drive the cross shaft 3023 to rotate about the first direction as an axis, thereby adjusting the angle of rotation of the battery box moving mechanism 303 arranged on the rotating mechanism 302 in the first direction. The second rotating assembly 3022 is rotatably connected to the cross shaft 3023. The second rotating assembly 3022 can be driven to rotate about the second direction as an axis, so as to rotate about the second direction as an axis relative to the cross shaft 3023, thereby adjusting the angle of rotation of the battery box moving mechanism 303 arranged on the rotating mechanism 302 in the second direction. Thereby, the rotation mechanism 302 can control the angle of rotation in two directions separately, with the rotation in one direction not affecting the rotation in the other direction.

In this embodiment, since the rotating assemblies in two directions are connected by the cross shaft 3023, rotations in two directions can be realized without affecting each other. Compared with a solution that requires a plurality of rotating assemblies to prevent different rotating assemblies from affecting each other, this embodiment saves the space occupied by the rotating mechanism 302, reduces the overall height of the battery box transferring device 300, allows the battery box transferring device 300 to meet the requirements of the operation of transferring a battery box at a lower position, thereby expanding the applications of the battery box transferring device 300.

Optionally, the first rotating assembly 3021 includes a first rotating rod 3021*a* connected to the cross shaft 3023 along the first direction. The first rotating rod 3021*a* drives the cross shaft 3023 to rotate about the first direction as an axis, such that the battery box is rotated about the first direction as an axis.

Optionally, the first rotating assembly 3021 further includes a first bracket 3021*c* and a first driving mechanism connected to the first rotating rod 3021*a*. The first bracket 3021*c* is fixedly arranged on the second moving plate 3012*d*. The cross shaft 3021 is rotatably supported on the first bracket 3021*c* around the first direction.

Optionally, the second rotating assembly 3022 includes a second rotating rod 3022*a* and a second driving mechanism connected to the cross shaft 3023 by means of the second rotating rod 3022*a* in the second direction. The second driving mechanism is also connected to the battery box moving mechanism 303. The second driving mechanism can rotate about the second direction as an axis relative to the cross shaft 3023, such that the battery box moving mechanism 303 is rotated about the second direction as an axis.

Optionally, the second rotating assembly 3022 further includes a second bracket 3022*c*. The second bracket 3022*c* is arranged on a bottom surface of the battery box moving mechanism 303. The second driving mechanism is connected to the second bracket 3022*c*. The second bracket 3022*c* is rotatably supported on the cross shaft 3023 in the second direction as an axis.

Specifically, the first driving mechanism drives the first rotating rod 3021*a* to rotate, the first rotating rod 3021*a* then drives the cross shaft 3023 to rotate, and the cross shaft 3023 drives the second rotating assembly 3022 and the battery box moving mechanism 303 that are connected thereto to tilt at a certain angle about the first direction as an axis. Since the second bracket 3022*c* is connected to the battery box moving mechanism 303, the first rotating rod 3021*a* rotates to drive the cross shaft 3023 to rotate, finally realizing the rotation of the battery box moving mechanism 303 in the first direction. After the first driving mechanism stops moving, the cross shaft is fixed in position relative to the second moving plate 3012*d*, the second driving mechanism drives the second rotating rod 3022*a* to rotate and the second rotating rod 3022*a* is fixedly connected to the cross shaft, thus causing the second driving mechanism to rotate about the second direction as an axis relative to the cross shaft. In this case, the battery box moving mechanism 303 arranged on the second support 3022*c* also rotates. Therefore, the second driving mechanism can realize the rotation of the battery box moving mechanism 303 in the second direction.

It should be understood that the first rotating rod 3021*a* being connected to the first driving mechanism can be considered that the first rotating rod 3021*a* is a part of the first driving mechanism. Similarly, the second rotating rod 3022*a* being connected to the second driving mechanism can be considered that the second rotating rod 3022*a* is a part of the second driving mechanism.

In this embodiment, taking the limited length of the cross shaft 3023 into consideration, the arrangement of the first rotating rod 3021*a* and the second rotating rod 3022*a* provides more space between the cross shaft 3023 and the rotation driving mechanism to accommodate other components, making the structure of the battery box transferring device 300 more compact. Further, when overload occurs, all the connection relationships between the first rotating rod 3021*a*, the second rotating rod 3022*a* and the cross shaft 3023 may be broken, thereby protecting the driving mechanism to a certain extent.

Optionally, the first rotating assembly 3021 further includes a first torque limiter 3021*b*. The first torque limiter 3021*b* is arranged on the first driving mechanism, that is, arranged on the first rotating rod 3021*a*, and configured to control torque of the first driving mechanism.

Specifically, the torque limiter 3021*b* may be of a worm and gear structure.

In this embodiment, the arrangement of the torque limiter 3021*b* on the first rotating rod 3021*a* can provide protection for the driving mechanism connected to the first rotating rod 3021*a* from mechanical damages caused by overloading of the first rotating rod 3021*a*.

Optionally, the second rotating assembly 3022 further includes a second torque limiter 3022*b* arranged on the second driving mechanism, in other words, arranged on the second rotating rod 3022*a*, and configured to control torque of the second driving mechanism. Specifically, the second rotating assembly 3022 may be of a similar structure to the first rotating assembly using similar principles, which will not be repeated here.

It should be understood that FIGS. 7 to 9 illustrate only part of the structure of the rotating mechanism 302, and the part of the structure symmetrical to the one shown in the figures is omitted in the first direction and the second direction.

Optionally, the battery box transferring device 300 includes a third driving mechanism configured to drive the translation mechanism 301, and a fourth driving mechanism configured to drive the battery box moving mechanism 303.

In this embodiment, the battery box transferring device 300 can be driven by the driving mechanism, thereby realizing automatic transfer of the battery box, reducing manual involvements and effectively saving manpower. The first driving mechanism, the second driving mechanism and the third driving mechanism may be controlled by one control system, or by different control systems.

Figure 10:
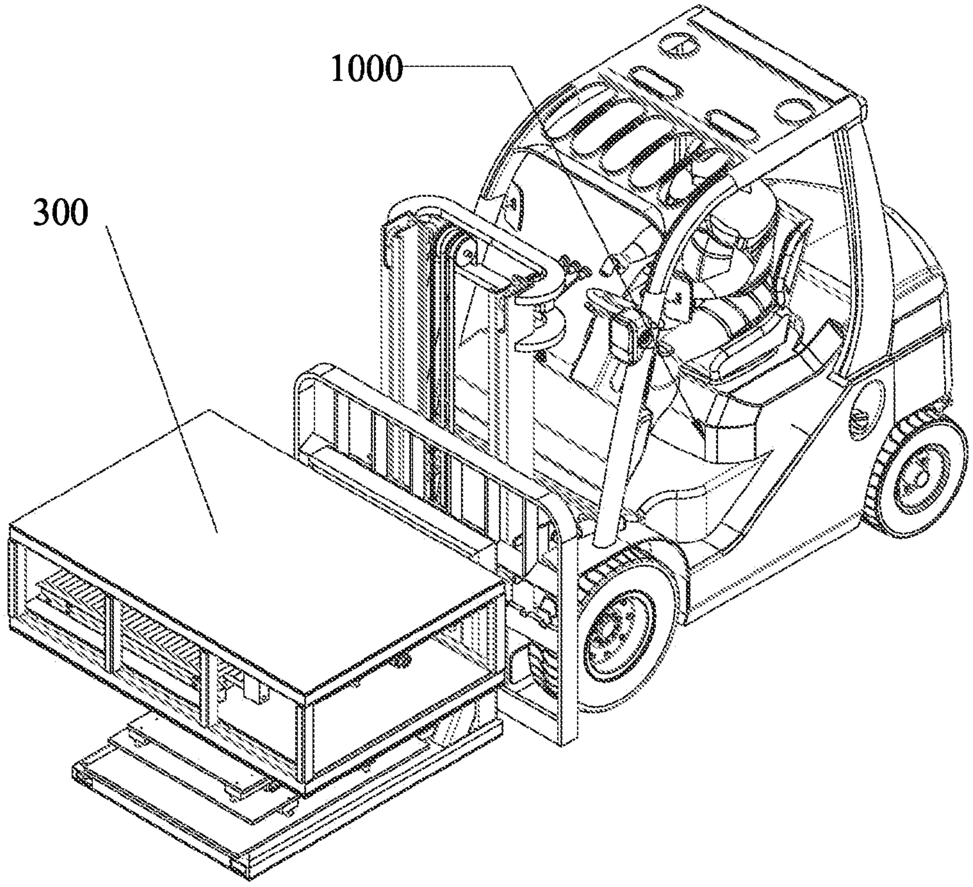
FIG. 10 is a schematic diagram showing the battery box transferring device is in use according to the present application.

FIG. 10 illustrate that the battery box transferring device 300 is in use. Optionally, the battery box transferring device 300 is arranged on a forklift 1000, and the battery box is placed into a battery cabinet by means of the device 300 and the forklift 1000.

Specifically, the battery box transferring device 300 may be used with the forklift, and may also be used with a crane, a fork truck, etc. for being adapted to different applications. In this embodiment, the battery box transferring device 300 may be used with other apparatuses to carry out the operation of battery box stacking in an efficient and labor-saving manner, further enriching the applications of the battery box transferring device 300.

In summary, the embodiments of the present application provide a battery box transferring device 300, which can quickly translate and rotate a battery box in different directions, flexibly and efficiently move the battery box to a desired position without manual pushing, improves the efficiency of transferring the battery box, and can be adapted to various transferring sites, thereby expanding the applications of the battery box.

While the present application has been described with reference to the preferred embodiments, various modifications can be made, and equivalents can be provided to substitute for the components thereof without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A battery box transferring device, comprising:

a translation mechanism configured to move a battery box in a first direction and/or a second direction, the first direction being perpendicular to the second direction;

a rotating mechanism arranged on the translation mechanism, the rotating mechanism comprising: a first rotating assembly and a second rotating assembly, wherein the first rotating assembly is configured to rotate the battery box about the first direction as an axis, and the second rotating assembly is configured to rotate the battery box about the second direction as an axis, wherein the rotating mechanism comprises a cross shaft, and the first rotating assembly is connected to the second rotating assembly by means of the cross shaft; and a battery box moving mechanism arranged on the rotating mechanism, the battery box moving mechanism being configured to pull the battery box into or push the battery box out of the battery box transferring device.

2. The device according to claim 1, wherein the battery box moving mechanism comprises:

a battery box compartment, a pushing assembly, and a roller assembly, wherein the pushing assembly and the roller assembly are arranged inside the battery box compartment; and the battery box compartment is configured to accommodate the battery box, and the pushing assembly is configured to move the battery box in the first direction, allowing the battery box to move on the roller assembly.

3. The device according to claim 2, wherein the pushing assembly comprises:

a guide rail arranged inside the battery box compartment in the first direction; and a push-pull portion arranged on the guide rail, the push-pull portion sliding along the guide rail to move the battery box.

4. The device according to claim 3, wherein the push-pull portion has a connector configured for connection to the battery box when the battery box is moved by the push-pull portion.

5. The device according to claim 1, wherein the translation mechanism comprises:

a first translation assembly configured to move the battery box in the first direction.

6. The device according to claim 5, wherein the first translation assembly comprises:

a base plate;

a first sliding rail arranged on the base plate in the first direction;

a first slider arranged on the first sliding rail; and a first moving plate arranged on the first slider, the first slider moving along the first sliding rail to drive the first moving plate to move in the first direction so as to move the battery box in the first direction.

7. The device according to claim 6, wherein the translation mechanism comprises:

a second translation assembly configured to move the battery box in the second direction.

8. The device according to claim 7, wherein the second translation assembly comprises:

a second sliding rail arranged on the first moving plate in the second direction, a second slider arranged on the second sliding rail, and a second moving plate arranged on the second slider, the second slider moving along the second sliding rail to move the second moving plate in the second direction.

9. The device according to claim 1, wherein the first rotating assembly comprises:

a first driving mechanism connected to the cross shaft in the first direction, the first driving mechanism driving the cross shaft to rotate about the first direction as an axis, such that the battery box is rotated about the first direction as an axis.

10. The device according to claim 9, wherein the first rotating assembly further comprises:

a first torque limiter arranged on the first driving mechanism and configured to control torque of the first driving mechanism.

11. The device according to claim 1, wherein the second rotating assembly comprises:

a second driving mechanism connected to the cross shaft in the second direction, the second driving mechanism driving the cross shaft (3023) to rotate about the second direction as an axis, such that the battery box is rotated about the second direction as an axis.

12. The device according to claim 11, wherein the second rotating assembly further comprises:

a second torque limiter (3022*b*) arranged on the second driving mechanism and configured to control torque of the second driving mechanism.

13. The device according to claim 1, wherein the device is arranged on a forklift, and the battery box is placed into a battery cabinet by means of the device and the forklift.

* * * * *